July 10, 1928.
O. WITTEL
OPTICAL UNIT FOR CAMERAS
Filed May 13, 1926
1,676,595
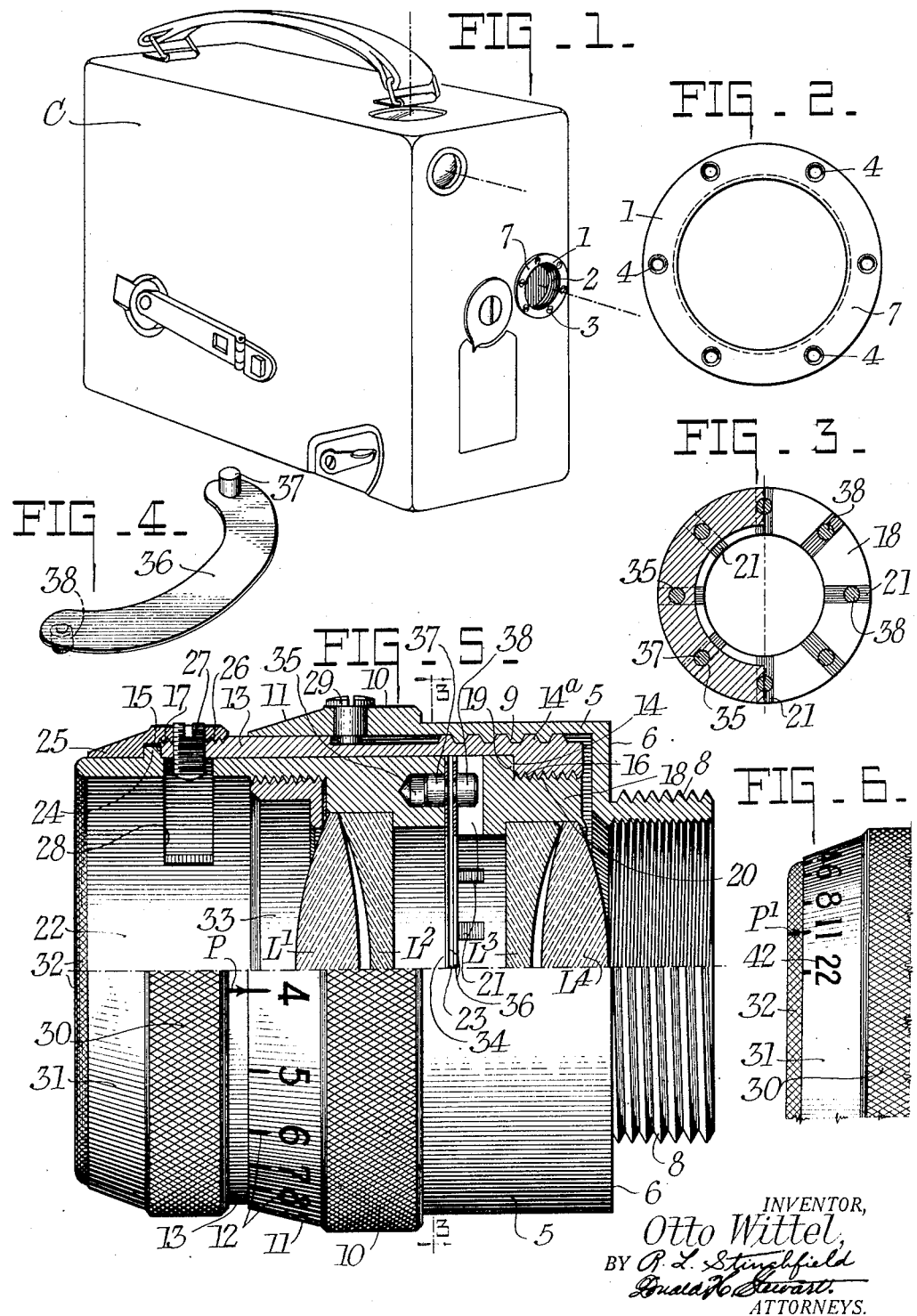

Patented July 10, 1928.

1,676,595

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

OPTICAL UNIT FOR CAMERAS.

Application filed May 13, 1926. Serial No. 108,796.

This invention relates to photography and particularly to optical units for cameras. One object of my invention is to provide an optical unit including an objective, diaphragm and focusing mount which will be self contained and extremely compact. Another object is to provide a device of the class described which may be quickly assembled and dis-assembled on cameras. Another object is to provide an objective with a very simple, self contained diaphragm which may be operated through a movable lens cell. Another object is to provide a diaphragm ring and lens cell in one piece, thus eliminating a number of parts, and other objects will appear hereinafter from the specification, the novel features being pointed out in the claims at the end thereof.

At the present time, there is a large variety of optical equipments which can be used on cameras. Objectives may be had in a great many different types, apertures, focal lengths, etc., and it is often desirable to use a number of objectives on a single camera, particularly for motion picture work. With the usual equipment a variety of focusing scales and diaphragm scales must be provided, one for each objective used.

My invention is for an interchangeable optical unit in which the focusing scale, diaphragm scale and diaphragm structure may be included so that this unit may be easily placed on a camera.

Coming now to the drawings, wherein like reference characters denote like parts throughout:

Fig. 1 shows a typical small motion picture camera equipped to receive an optical unit constructed in accordance with my invention;

Fig. 2 is a plan of the unit receiving ring;

Fig. 3 is a fragmentary section on line 3—3 of Fig. 5, parts being broken away to better show the diaphragm ring structure;

Fig. 4 is a perspective of a diaphragm leaf;

Fig. 5 is a half section and half elevation of an optical unit constructed in accordance with and illustrating one embodiment of my invention; and Fig. 6 is a fragmentary side elevation showing the diaphragm adjusting scale.

As shown in Fig. 1, I prefer to provide a camera C with a ring 1 threaded at 2 to receive my optical unit. This ring may be attached or affixed to the camera in any desired manner such as by screws 3 passing through the countersunk screw holes 4.

The embodiment of my optical unit shown in Fig. 5 preferably consists of a tubular mount 5, having a shoulder 6 adapted to engage the flange 7 of ring 1, and threaded at 8 to screw into thread 2. This tube also includes an internal thread 9, a knurled band 10 by which it may be screwed to and from its support 1, and a beveled portion 11. This bevel is adapted to receive a focusing scale 12.

A second tube 13 forms the lens barrel. This tube is threaded at $14^a$ to engage threads 9 so that the tube may be moved axially of the mount 5. It is also provided with a pair of shoulders 14 and 15, and is threaded at 16 and 17. A set screw 29 limits the movement of tube 13 relative to the mount.

The objective may be of any type and is here shown as consisting of two components, of several lenses designated $L^1$, $L^2$, $L^3$ and $L^4$. One component, comprising $L^3$, and $L^4$, is mounted in a lens cell 18 having a shoulder 19 located by shoulder 14 and threads 20 engaging threads 16. This cell is fixed in the tube 13. The front wall of the cell carries a plurality of slots 21 as best shown in Fig. 3. Tube 13 preferably carries a pointer P to indicate the focus on scale 12.

The other lens component, comprising $L^1$ and $L^2$, is mounted in a third tubular telescoping member 22, which constitutes a cell for the front component and at the same time an operating ring for the diaphragm designated broadly as 23 to be hereinafter more fully described. Cell 22 preferably carries a flange 24 which lies against shoulder 15 and it is held against this shoulder by a collar 25 having a threaded portion 26 engaging the thread 17. A pin or screw 27 holds the collar in a set position. By extending the screw 27 into slot 28 in cell 22, it also limits the turning movement of this member. Collar 25 is provided with a knurled or roughened operating portion 30 by which the lens barrel may be turned, and a beveled face 31 on which a diaphragm scale may be engraved. Thus by bringing a pointer $P^1$ to the desired point on the scale 42 the diphragm may be set. It should be noted that the shoulders 14 and 15 hold the lens cells at a predetermined fixed spacing.

Cell 22 is provided with a knurling 32 beyond the end of the lens barrel. The lenses $L^1$ and $L^2$ may be retained in place by spinning as are the lenses $L^3$ and $L^4$ or by the threaded ring 33 as shown.

The rear face 34 of cell 22 is apertured at 35, the apertures corresponding in spacing and number to the slots 21 and the faces of the cells 22 and 18 are spaced just a sufficient distance to receive the diaphragm leaves. As shown in Fig. 4, these may be of the usual shape, the body being a thin curved plate 36 having studs 37 and 38 one projecting from each side. One of these studs fits in an aperture 35 thus forming a pivotal connection with cell 22 and the other stud 38 lies in a slot 21, so that it may slide therein. With this construction the usual relatively movable diaphragm rings are replaced by the lens cells.

As above described, each optical unit is complete in itself and may be placed on any camera having the proper fitting, merely by screwing it into position. The focusing mount and iris diaphragm are both included in a space no larger than that usually needed for the lens barrel alone. Thus long or short focal length lenses may be used at will, and lenses with different apertures can be used interchangeably without using different diaphragm plates and focusing scales apart from the units.

In operation, an optical unit is screwed into ring 1 by knurling 10 until the shoulder 6 is firmly seated on the flange 7. By turning the knurled band 30, the lens barrel may be moved until pointer P is opposite the desired focal distance on scale 12. The aperture of the diaphragm may be set by turning the knurled ring 32 to bring a pointer $P^1$ opposite a diaphragm scale 42 on the beveled surface 31.

Obviously certain features of my invention are suitable for use on a variety of different lens structures, and although I have shown a preferred embodiment of my invention, I do not wish to be restricted to the structure shown except as indicated in the accompanying claims.

Having thus described my invention, what I claim as new and desire to secure by Letters Patent is:

1. In an optical unit for cameras, the combination with an objective including two lens cells, of a barrel for supporting the lens cells at a fixed separation, connections between one lens cell and the barrel through which one lens cell may turn therein, and a plurality of diaphragm leaves operatively connected to the movable and fixed lens cells whereby the light opening may be altered by moving the movable lens cell.

2. In an optical unit for cameras, the combination with an objective including two lens cells, of a barrel for supporting the lens cells at a fixed separation, connections between one lens cell and the barrel through which one lens cell may turn therein, and a plurality of diaphragm leaves supported between the lens cells, pivotal connections between one end of each diaphragm leaf and one cell, and a pin-and-slot connection between the other end of each diaphragm leaf and the other lens cell whereby the light opening between the diaphragm leaves may be controlled by turning the movable lens cell.

3. In an optical unit for cameras, the combination with an objective including two lens cells, of a barrel for supporting the lens cells at a fixed separation, connections between one lens cell and the barrel through which one lens cell may turn therein, and a plurality of diaphragm leaves supported between the lens cells, two studs carried by each diaphragm leaf, one of the lens cells being apertured and the other lens cell being slotted to receive the diaphragm leaf studs, whereby the diaphragm light opening may be controlled by turning the movable lens cell.

4. In an optical unit for cameras, the combination with an objective including two lens cells, a mount for the lens cells comprising a barrel for holding the cells at a predetermined fixed spacing, a flange and slot connection between one cell and the barrel permitting one cell to turn therein, and a diaphragm mechanism included between the lens cells controlled by the movable lens cell.

5. In an optical unit for cameras, the combination with an objective including two lens cells, a mount for the lens cells comprising a barrel for holding the cells at a predetermined fixed spacing, a flange and slot connection between one cell and the barrel permitting one cell to turn therein, a diaphragm mechanism included between the lens cells controlled by the movable lens cell, an operating member projecting from the inside of the lens barrel for moving the movable lens cell whereby the diaphragm mechanism may be moved.

6. In an optical unit for cameras, the combination with an objective including two lens cells, a mount for the lens cells comprising a barrel for holding the cells at a predetermined fixed spacing, connections between one lens cell and the barrel on which the cell may turn, a pin and slot connection between this cell and the barrel to limit the turning movement of the cell, and a diaphragm mechanism between two lens cells, one of which is the movable one, said diaphragm mechanism being operatively connected to this movable cell, whereby the diaphragm opening may be altered.

7. In an optical unit for cameras, the combination with an objective including two lens cells, a mount for the lens cells comprising a barrel for holding the cells, having a pair of shoulders therein, one cell being located by one shoulder and another cell being located by the other shoulder, whereby the spacing between the lens cells is fixed, connections between one cell and the barrel permitting the cell to turn on the shoulder, said movable cell forming an actuating member for an iris diaphragm mechanism mounted between the cells.

8. In an optical unit for cameras, the combination with an objective including two lens cells, a mount for the lens cells comprising a barrel for holding the cells, having a pair of shoulders therein, one cell being located by one shoulder and another cell being located by the other shoulder, whereby the spacing between the lens cells is fixed, one lens cell having a flange engaging a shoulder and a slot in the cell near the shoulder, a ring adapted to hold the flange against the shoulder and permitting it to turn thereagainst, a set screw for definitely locating the ring, said set screw by extending into the slot also limiting the possible movement of the cell, an iris diaphragm mounted between the cells, and connections between the diaphragm and the movable cell for altering the diaphragm opening by moving the cell.

9. In an optical unit for cameras, the combination with three tubular telescoping members, the first forming a mount, said mount having means for connecting it to a camera, the second tubular member having a threaded connection with the first so that it may be moved axially thereof, a lens cell mounted fixedly in the second tubular member, the third member constituting a mount for another lens cell, and a movable member for supporting one end of a diaphragm mechanism, said diaphragm mechanism being mounted between the two lens cells.

10. In an optical unit for cameras, the combination with an objective of an iris diaphragm therefor, including a pair of rotatable members, each holding one component of the objective, a plurality of diaphragm leaves, each of which engages the rotatable members holding the components of the objective, whereby rotatable movement of one component relative to the other may adjust the diaphragm setting.

11. In an optical unit for cameras, the combination with an objective barrel, of a plurality of lens cells having a fixed spacing mounted in the barrel, one lens cell being rotatably mounted, a plurality of diaphragm leaves operatively connected to a fixed and the rotatably mounted lens cells, whereby the diaphragm setting may be altered by rotating the lens cell in its own plane.

12. In an optical unit for cameras, the combination with an objective, of separately mounted lenses forming the components of the objective, a relatively fixed mount for one component, a relatively movable mount for the other component, means for retaining a fixed separation between the components, and a plurality of diaphragm leaves adapted to engage the relatively movable components, whereby the diaphragm opening may be altered by moving one component relative to the other.

13. In an optical unit for cameras, the combination with an objective, of a plurality of lenses forming components of the objective, a mount for the components, a fixed member for holding one component in the mount, a movable member for holding a lens component, means for holding the components with a fixed spacing between components, and an iris diaphragm including a plurality of leaves engaging both the fixed and movable members holding the lens components.

14. In an optical unit for cameras, the combination with an objective including a plurality of lens cells, a barrel in which the lens cells are mounted with fixed spacings therebetween, one cell being movably mounted and having an operative extension at one end of the barrel, a diaphragm mechanism between the cells, operative connections between the diaphragm and the movable lens cells, and amount for the lens barrel in which the latter is movably mounted, said mount including a cylindrical casing in which the lens barrel may move axially, and means for limiting the movement of the lens barrel relatively to the mount.

15. In a lens mount, an outer tubular member, a lens cell mounted to rotate in said member, means for holding the lens cell against axial movement, and an adjustable diaphragm mechanism in said tubular member and behind the lens cell and connected to the lens cell whereby turning of the lens cell will adjust the diaphragm.

16. In a lens mount, an outer tubular member, a lens cell mounted to rotate in said member, means for holding the lens cell against axial movement, an adjustable iris diaphragm mechanism in the mount behind the lens cell, and having connections with the outer member and with the rotatable cell whereby it may be adjusted by rotation of the cell.

Signed at Rochester, New York this 11th day of May, 1926.

OTTO WITTEL.